United States Patent
Waskie et al.

(10) Patent No.: US 9,174,684 B1
(45) Date of Patent: Nov. 3, 2015

(54) MULTI-POSITION ENDGATE CABLE

(71) Applicant: GM GLOBAL TECHNOLOGY OPERATIONS LLC, Detroit, MI (US)

(72) Inventors: David B. Waskie, Harrison Township, MI (US); Hugh S. Bauer, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/268,533

(22) Filed: May 2, 2014

(51) Int. Cl.
*B62D 33/00* (2006.01)
*B62D 33/023* (2006.01)
*B62D 33/027* (2006.01)

(52) U.S. Cl.
CPC .......... *B62D 33/023* (2013.01); *B62D 33/0273* (2013.01)

(58) Field of Classification Search
CPC ............................ B62D 33/03; B62D 33/0273
USPC ............. 296/57.1, 180.5, 106; 16/82; 135/69
See application file for complete search history.

(56) References Cited

U.S. PATENT DOCUMENTS

| | | | |
|---|---|---|---|
| 1,125,982 A | 1/1915 | Dufala | |
| 5,645,310 A * | 7/1997 | McLaughlin | 296/180.5 |
| 5,660,425 A * | 8/1997 | Weber | 296/163 |
| 5,934,727 A | 8/1999 | Storc et al. | |
| 6,450,559 B1 | 9/2002 | Renke | |
| 6,607,232 B2 | 8/2003 | Katulka | |
| 2005/0076941 A1* | 4/2005 | Larson et al. | 135/68 |
| 2011/0181068 A1* | 7/2011 | Zielinsky | 296/57.1 |
| 2013/0319488 A1* | 12/2013 | Chiu | 135/67 |

* cited by examiner

*Primary Examiner* — Joseph D Pape
(74) *Attorney, Agent, or Firm* — Quinn Law Group, PLLC

(57) ABSTRACT

An endgate cable mechanism includes an outer housing defining a longitudinal tunnel and an inner fitting slidably disposed within the longitudinal tunnel. A first transverse hole is in the outer housing. A second transverse hole, which is spaced longitudinally from the first transverse hole, is also defined in the outer housing. A plunger is selectively extendable from the inner fitting to engage with one of the first transverse hole and the second transverse hole. The endgate cable mechanism has a first effective length when the plunger is engaged with the first transverse hole and has a second effective length when the plunger is engaged with the second transverse hole.

11 Claims, 3 Drawing Sheets

MULTI-POSITION ENDGATE CABLE

TECHNICAL FIELD

This disclosure relates to openings for cargo compartments, such as endgates or tailgates.

BACKGROUND

Some vehicles with cargo compartments or cargo boxes use endgates or tailgates to allow access to an end or side of the cargo area. Endgates may be hinged boards or doors that are often found at the rear of the vehicle and can be lowered during loading and unloading.

SUMMARY

An endgate cable mechanism is provided. The endgate cable mechanism may span between a cargo box and an endgate of a vehicle. The endgate cable mechanism includes an outer housing defining a longitudinal tunnel and an inner fitting slidably disposed within the longitudinal tunnel. A first transverse hole is in the outer housing. A second transverse hole is also defined in the outer housing.

The second transverse hole is spaced longitudinally from the first transverse hole. A plunger is selectively extendable from the inner fitting to engage with one of the first transverse hole and the second transverse hole. The endgate cable mechanism has a first effective length when the plunger is engaged with the first transverse hole, and has a second effective length when the plunger is engaged with the second transverse hole. Therefore, the endgate cable mechanism allows a plurality of deployed positions for the endgate relative to the cargo box vehicle.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
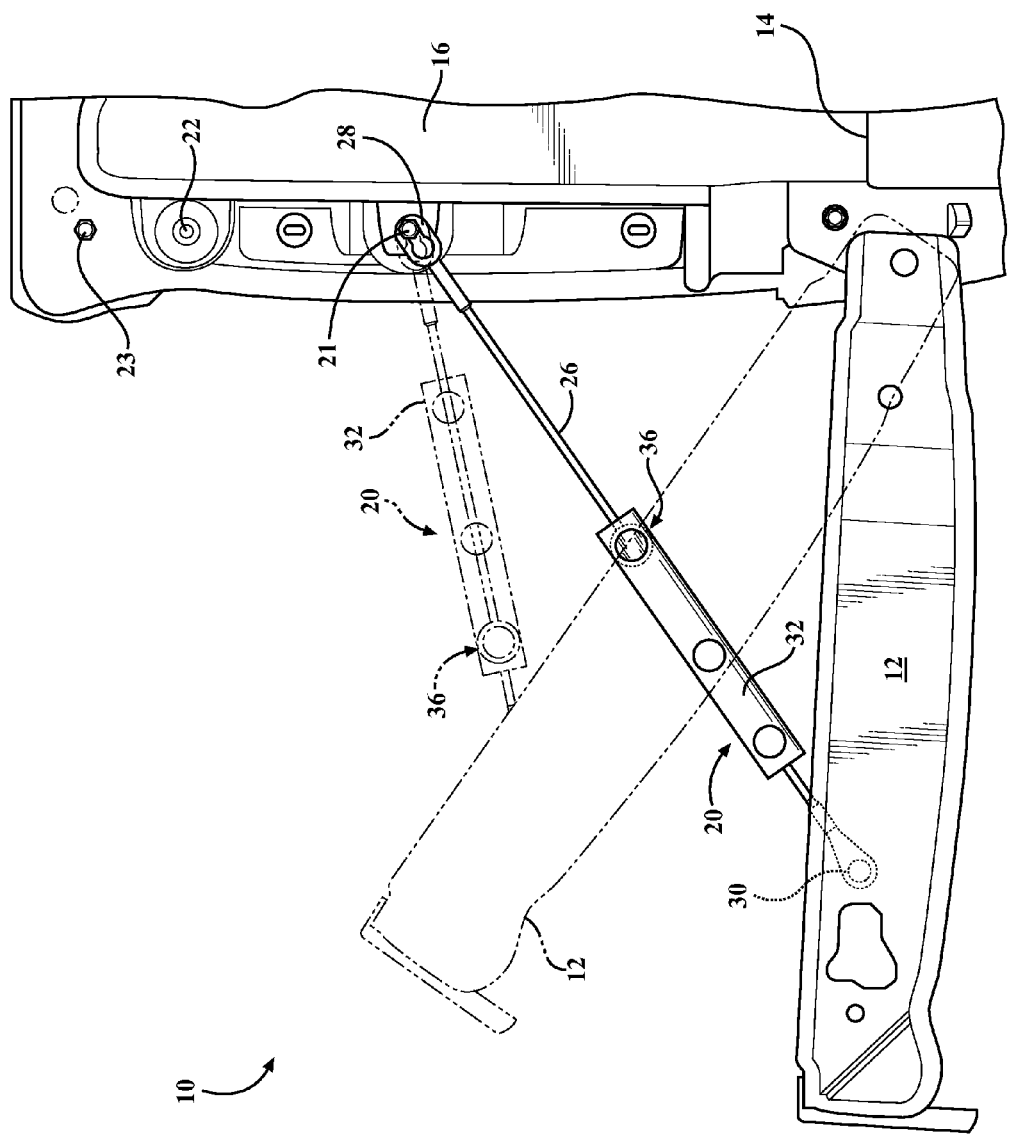
FIG. 1 is a schematic, side view of an endgate system with an endgate illustrated in a fully open position and, in phantom, in one of a plurality of partially deployed positions.

Referring to the drawings, like reference numbers correspond to like or similar components wherever possible throughout the several figures. FIG. 1 shows a schematic side or plan view of a multi-position endgate system 10 with an endgate 12 in a fully open or fully deployed position. FIG. 1 also shows, in phantom, the endgate 12 in one of a plurality of partially deployed positions.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

In the endgate system 10, the endgate 12 is pivotally mounted relative to a storage box floor 14, which may be referred to as the floor 14. The endgate 12 may also be referred to as a tailgate. A storage box wall 16 is generally perpendicular to the floor 14. The endgate 12, floor 14, and wall 16 collectively define a cargo area, cargo box, cargo compartment of a vehicle (the remainder of which is not shown). The specific structure to which the endgate 12 is attached may vary depending upon the configuration and type of vehicle—some may attach the endgate 12 to the walls 16 and some to the floor 14—such that the endgate 12 may be referred to as being attached to the cargo box in general.

FIG. 1 shows the endgate 12 in the fully open position, which is substantially horizontal relative to the floor 14 (and, likely, the ground). In a closed or stowed position, not shown, the endgate 12 is substantially vertical (as viewed in FIG. 1) and abuts the wall 16 to close off the cargo box of the vehicle and at least partially define the boundaries of the cargo compartment.

As used herein, the term substantially refers to quantities, values, dimensions, or alignments that are within manufacturing variance or tolerance ranges of being exact. Substantially equal dimensions, for example, may be planned as ideally equal but normal manufacturing tolerances may cause the resulting dimensions to vary by 10-20% for different pieces. Substantially aligned, for example, refers components that are intended to be truly aligned but may be slightly offset when assembled under real world manufacturing conditions.

The vehicle (partially shown) upon which the endgate system 10 is mounted may be, for example and without limitation: a pickup truck, a wagon, a cross-over, or a sport-utility vehicle (SUV). When used on wagons, cross-over vehicles, or sport utility vehicles, the endgate 12 may cooperate with a door, hatch, or other structure that opens upward.

The endgate 12 is shown in phantom in one of its partially deployed positions. A platform (not shown), may be placed on top of the endgate 12, such that the platform forms a work surface or a level surface for loading sheet cargo such as plywood or drywall. The platform itself may be a plywood board, metal sheet, or plastic table.

A multi-position endgate cable, which may simply be referred to as a cable mechanism 20, spans between the endgate 12 and the wall 16. The cable mechanism 20 is selectively attached to, for example and without limitation: a first anchor point 21, a second anchor point 22, or a third anchor point 23.

The first anchor point 21, the second anchor point 22, and the third anchor point 23 may be collectively or generically referred to as one or more anchor points, or any one may be generically referred to as an anchor point. The configuration of FIG. 1 illustrates three anchor points but additional anchor points may be formed on the wall 16. Note that in many configurations, an opposing wall 16 will have similar anchor points.

For simplicity the description herein may refer to connection between the cable mechanism 20 and the first anchor point 21. However, any reference to the first anchor point 21 applies equally to the second anchor point 22, the third anchor point 23, or any additional anchor points.

The figures illustrate how the cable mechanism 20 and the first anchor point 21, the second anchor point 22, and the third anchor point 23 cooperate to allow the endgate 12 to be placed into numerous, different, deployed positions. Each of the different deployed positions sets the endgate 12 at a different angle relative to the floor 14 or the wall 16. The cable mechanism 20 and the endgate 12 are capable of carrying substantial loads at each of the deployed positions.

The first anchor point 21, the second anchor point 22, and the third anchor point 23 are fixedly attached to the wall 16, and may be bosses extending from the wall 16 or bolts attached to the wall 16. In the example shown in the figures, the first anchor point 21 is a bolt, which may be the default or pre-set position for attachment of the cable mechanism 20. The second anchor point 22 illustrated in the figures is a striker, which may also serve to lock the endgate 12 to the wall 16 when the endgate 12 is closed.

The endgate 12 is moveable between its closed position proximal to the wall 16 and a plurality of open or deployed positions distal to the storage box wall 16. As described herein, the cable mechanism 20 is configured to be adjustable between a plurality of different effective lengths. The effective length of the cable mechanism 20 and the specific anchor point (either the first anchor point 21, the second anchor point 22, of the third anchor point 23) to which the cable mechanism 20 is attached determines the open positions of the endgate 12. Note that the effective length of the cable mechanism 20 can also vary the position of the endgate 12, even when the cable mechanism 20 is attached to the same anchor point, as illustrated in FIG. 1

As viewed in the solid lines of FIG. 1, the cable mechanism 20 is attached to the first anchor point 21 and is shown at a first effective length, which is its primary, full-length, position. The solid-line configuration shown in FIG. 1 allows the endgate 12 to be fully deployed to an angle of about one hundred and eighty degrees relative to the floor 14 or about ninety degrees relative to the wall 16.

As illustrated by the phantom lines of FIG. 1, the cable mechanism 20 is still attached to the first anchor point 21 but is shown at a different effective length, which is actually a third effective length. The phantom-line configuration shown in FIG. 1 allows the endgate 12 to be partially deployed to an angle of about fifty-five degrees relative to the wall 16. The third effective length of the cable mechanism 20 (phantom lines) is less than the first effective length of the cable mechanism 20 (solid lines).

Referring also to FIG. 2A and FIG. 2B, and with continued reference to FIG. 1, there are shown additional views of the cable mechanism 20 which further illustrate how the cable mechanism adjusts or reconfigures between different effective lengths. FIG. 2A shows the cable mechanism 20 at the first effective length, as shown in FIG. 1. However, FIG. 2B shows the cable mechanism 20 at a second effective length, which is shorter than the first effective length but longer than the third effective length. The second effective length may allow the cable mechanism 20 to lower the endgate 12 to an angle of about seventy degrees relative to the wall 16.

The cable mechanism 20 includes a cable 26 attached to a removable end piece 28. A fixed end piece 30 pivotally attaches one end of the cable mechanism 20 to the endgate 12. The cable 26 may be a wire or a rope, and may be formed from, for example and without limitation: stranded metal, plastic, or natural or synthetic fibers (such as aramid fibers). As the endgate 12 rotates from one of the deployed positions to its closed position (flush with the wall) and tension is removed from the cable mechanism 20, the cable 26 folds or flexes.

The removable end piece 28 selectively attaches the cable 26 to one of the first anchor point 21, the second anchor point 22, or the third anchor point 23 on the wall 16, which provides some variability in the angle of the endgate 12 relative to the wall 16. Note that the cable mechanism 20 could be reversed, such that the cable 26 is attached to the end of the cable mechanism with the fixed end piece 30.

The cable mechanism 20 includes an outer housing 32, which defines a longitudinal tunnel 34 through its length. When the endgate 12 is deployed, the cable mechanism 20 is placed into tension and the cable 26 is generally aligned with the outer housing 32 and the longitudinal tunnel 34.

An inner fitting 36 is slidably disposed within the longitudinal tunnel 34. Movement of the inner fitting 36 relative to the outer housing 32 alters the effective length of the cable mechanism 20. The cable 26 is illustrated as attached to the inner fitting 36, but may alternatively be attached to the outer housing 32.

A first transverse hole or a first hole pair 37 is defined in the outer housing 32. As illustrated in FIGS. 2A and 2B, the holes may extend completely through the outer housing 32. However the first hole pair 37 may also be recessions formed on the interior of the outer housing 32 such that they intersect the longitudinal tunnel 34.

A second transverse hole or second hole pair 38 is defined in the outer housing 32 and is spaced longitudinally from the first transverse hole. Additionally, a third hole pair 39 is spaced longitudinally from the first hole pair 37 and the second hole pair 38. The second hole pair 38 allows the cable mechanism 20 to be locked or fixed at the second effective length, as shown in FIG. 2B. The third hold pair 39 allows the cable mechanism 20 to be locked or fixed at the third effective length, as shown in phantom lines in FIG. 1.

The cable mechanism 20 may further include additional holes or hole pairs to allow additional effective lengths by adjustment of the inner fitting 36. The longitudinal tunnel 34 and the inner fitting 36 illustrated in the figures have a generally-cylindrical shape. However, note that the longitudinal tunnel 34 and the inner fitting 36 could also be rectangular or other prismatic shapes.

Figure 2:
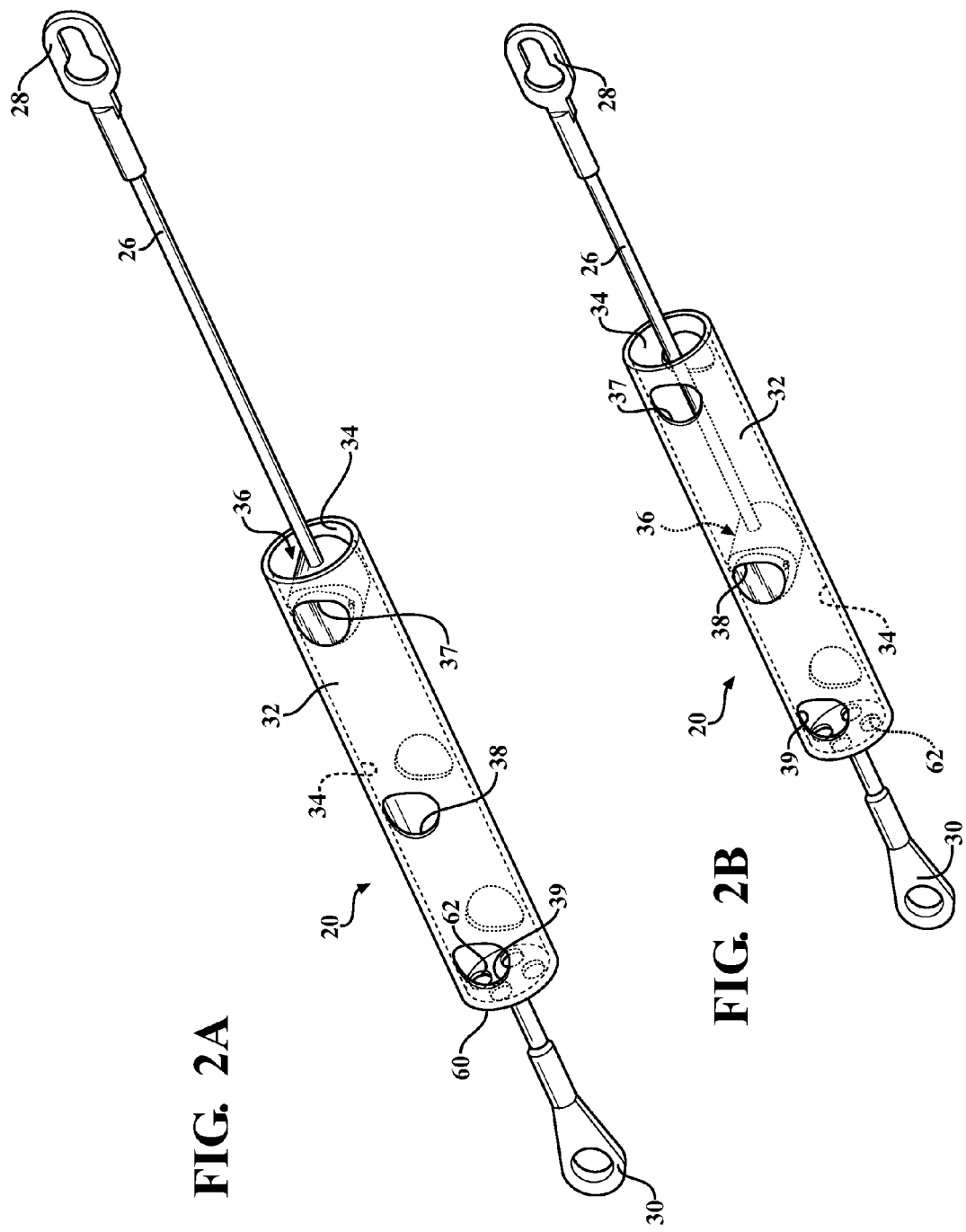
FIG. 2A is a schematic, isometric view of a cable mechanism in a primary position, similar to that shown in FIG. 1.
FIG. 2B is a schematic, isometric view of the cable mechanism in one of a plurality of secondary positions.
Figure 3:
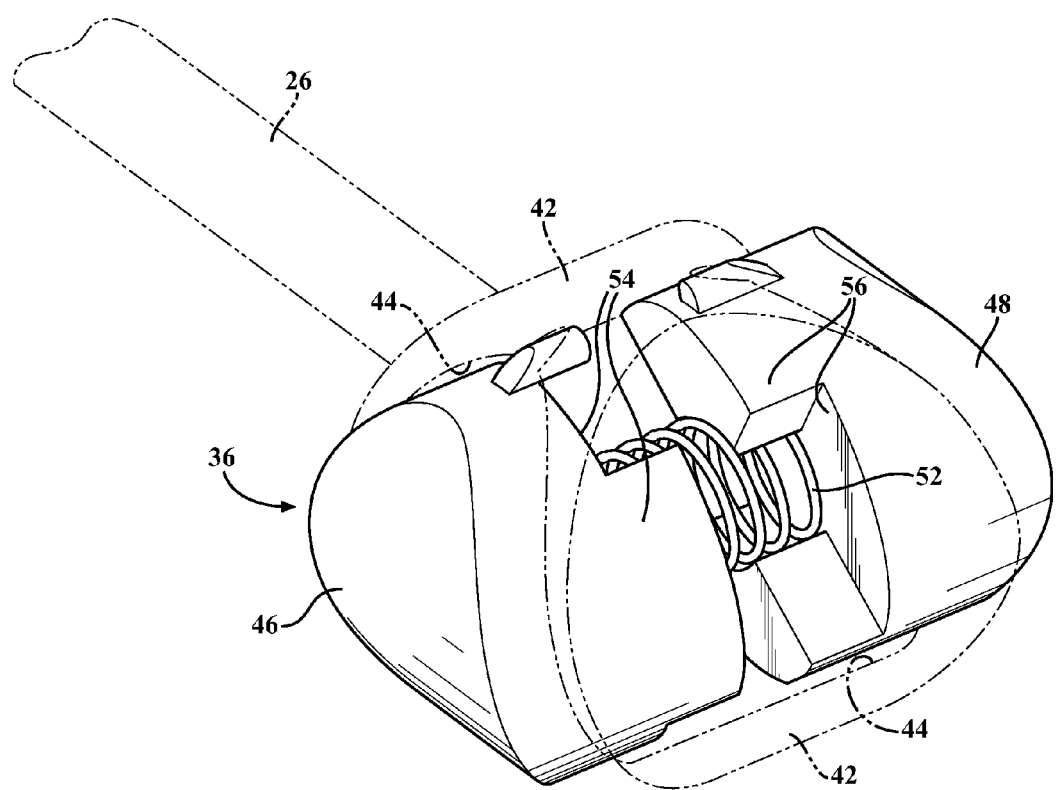
FIG. 3 is a schematic, isometric view of an inner fitting of the cable mechanism.

Referring also to FIG. 3, in addition to FIGS. 1-2B, there is shown an isometric view of the inner fitting 36 to better illustrate the components and elements with which the outer housing 32 cooperates to alter the effective length of the cable mechanism 20. The inner fitting 36 includes an inner housing 42 and transverse tunnel 44 defined by, or through, the inner housing 42. In FIG. 3, the inner housing 42 is shown in phantom to better illustrate the components therein.

A first plunger 46 is selectively extendable from the inner fitting 36. In the configuration illustrated, the first plunger 46 rides within the transverse tunnel 44 and the first plunger 46 is completely surrounded by the transverse tunnel 44. However, in other configurations, the inner housing 42 may not fully form a tunnel and may simply support the longitudinal ends of the inner fitting 36.

The first plunger 46 is configured to selectively engage with one of the first hole pair 37, the second hole pair 38, and the third hole pair 39. Therefore, the location of the inner fitting 36 changes relative to the outer housing 32, such that the cable mechanism 20 has a first effective length when the first plunger 46 is engaged with the first hole pair 37, a second effective length when the first plunger 46 is engaged with the second hole pair 38, and a third effective length when the first plunger 46 is engaged with the third hole pair 39.

In some configurations, a second plunger 48 is selectively extendable from the inner fitting 36, such that the first plunger 46 and the second plunger 48 cooperate to selectively engage with one of the first hole pair 37, the second hole pair 38, and the third hole pair 39. The cable mechanism 20 can function with a single hole or, as shown in FIGS. 2A and 2B, there may be multiple holes into which the first plunger 46 and the second plunger 48 both extend.

The inner fitting 36 includes a biasing member 52 disposed between the first plunger 46 and the second plunger 48. The biasing member 52 urges the first plunger 46 and the second plunger 48 transversely outward. As used herein, the term outward refers to movement or biasing toward the outer housing 32.

The inner fitting 36 of the cable mechanism 20 further includes a first interlocking tooth pattern 54, or simply first tooth pattern, formed on the first plunger 46 and a second interlocking tooth pattern 56, or simply second tooth pattern, formed on the second plunger 48. The first interlocking tooth pattern 54 and the second interlocking tooth pattern 56 are formed on the interior of the first plunger 46 and the second plunger 48, respectively, such that they are adjacent the biasing member 52.

As the first plunger 46 and the second plunger 48 are urged or biased transversely inward, the inner fitting 36 is free from the outer housing 32. As used herein, inward refers to movement or bias away from the interior of the outer housing 32. The first interlocking tooth pattern 54 meshes with the second interlocking tooth pattern 56, allowing portions of the first plunger 46 to travel further inward and overlap with portions of the second plunger 48.

The first plunger 46 and the second plunger 48 carry loads between the outer housing 32 and the inner fitting 36—and eventually the cable 26—when the cable mechanism 20 is loaded in tension. The first interlocking tooth pattern 54 and the second interlocking tooth pattern 56 provide added contact surface, relative to planar interior surfaces on the first plunger 46 and the second plunger 48, for load transfer between the inner housing 42 and first plunger 46 and the second plunger 48.

The outer housing 32 of the cable mechanism 20 includes an end plug 60 formed on one end thereof. The end plug 60 provides attachment structure between the outer housing 32 and the fixed end piece 30. When the endgate 12 is fully or partially deployed, as shown in FIGS. 1, 2A, and 2B, the end plug 60 could allow water or other fluids to collect within the longitudinal tunnel 34. Therefore, at least one drain hole 62 may be defined through the end plug 60, such that pooling of liquids within the longitudinal tunnel 34 is limited.

The cable mechanism 20 illustrated in the figures is shown with a short length of cable (not numbered) between the outer housing 32 and the fixed end piece 30. However, the fixed end piece 30 may be formed as a portion of the outer housing 32, such that the only portion of cable on the cable mechanism 20 is the cable 26. Furthermore, the fixed end piece 30 may be attached to the cable 26 and the removable end piece 28 attached to the outer housing 32, such that the outer housing 32 is on the wall or box side and the cable 26 is on the gate side.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. An endgate cable mechanism, comprising:
   an outer housing defining a longitudinal tunnel;
   an inner fitting slidably disposed within the longitudinal tunnel;
   a first transverse hole defined in the outer housing;
   a second transverse hole defined in the outer housing and spaced longitudinally from the first transverse hole; and
   a plunger selectively extendable from the inner fitting to engage with one of the first transverse hole and the second transverse hole, such that the endgate cable mechanism has a first effective length when the plunger is engaged with the first transverse hole and a second effective length when the plunger is engaged with the second transverse hole.

2. The endgate cable mechanism of claim 1, further comprising:
   a cable attached to one of the outer housing and the inner fitting.

3. The endgate cable mechanism of claim 2, wherein the first transverse hole is a first hole pair, the second transverse hole is a second hole pair, and the plunger is a first plunger, and further comprising:
   a second plunger selectively extendable from the inner fitting, such that the first plunger and the second plunger cooperate to selectively engage with one of the first hole pair and the second hole pair.

4. The endgate cable mechanism of claim 3, further comprising:
   a biasing member disposed between the first plunger and the second plunger, such that the first plunger and the second plunger are urged transversely outward.

5. An endgate cable mechanism, comprising:
   an outer housing defining a longitudinal tunnel;
   an inner fitting slidably disposed within the longitudinal tunnel;
   a cable attached to one of the outer housing and the inner fitting;
   a first transverse hole pair defined in the outer housing;
   a second transverse hole pair defined in the outer housing and spaced longitudinally from the first transverse hole pair; and
   a first plunger selectively extendable from the inner fitting to engage with one of the first transverse hole pair and the second transverse hole pair, such that the endgate cable mechanism has a first effective length when the first plunger is engaged with the first transverse hole pair and a second effective length when the first plunger is engaged with the second transverse hole pair;
   a second plunger selectively extendable from the inner fitting, such that the first plunger and the second plunger cooperate to selectively engage with one of the first hole pair and the second hole pair;
   a biasing member disposed between the first plunger and the second plunger, such that the first plunger and the second plunger are urged transversely outward;
   a first interlocking tooth pattern formed on the first plunger adjacent the biasing member;
   a second interlocking tooth pattern formed on the second plunger adjacent the biasing member, wherein the first interlocking tooth pattern meshes with the second interlocking tooth pattern when the first plunger and the second plunger are urged transversely inward.

6. The endgate cable mechanism of claim 5, further comprising:
   an end plug formed on one end of the outer housing; and
   at least one drain hole defined through the end plug, such that pooling of liquids within the longitudinal tunnel is limited.

7. The endgate cable mechanism of claim 6, further comprising:
   a third hole pair defined in the outer housing and spaced longitudinally from the first hole pair and the second hole pair, wherein the endgate cable mechanism has a third effective length when the first plunger and the second plunger are engaged with the third hole pair.

8. The endgate cable mechanism of claim 1, wherein the first transverse hole is a first hole pair, the second transverse hole is a second hole pair, and the plunger is a first plunger, and further comprising:
   a second plunger selectively extendable from the inner fitting, such that the first plunger and the second plunger cooperate to selectively engage with one of the first hole pair and the second hole pair.

9. The endgate cable mechanism of claim 8, further comprising:
   a biasing member disposed between the first plunger and the second plunger, such that the first plunger and the second plunger are urged transversely outward.

10. A vehicle having a cargo box, comprising:
    an endgate pivotally attached to the cargo box and selectively rotatable between a stowed position and a plurality of deployed positions; and
    an endgate cable mechanism spanning between the endgate and the cargo box when the endgate is in the plurality of deployed positions, including:
       an outer housing defining a longitudinal tunnel;
       an inner fitting slidably disposed within the longitudinal tunnel;
       a first transverse hole pair defined in the outer housing;
       a second transverse hole pair defined in the outer housing and spaced longitudinally from the first transverse hole pair;
       a first plunger selectively extendable from the inner fitting; and
       a second plunger selectively extendable from the inner fitting, such that the first plunger and the second plunger cooperate to selectively engage with one of the first transverse hole pair and the second transverse hole pair,
       wherein the endgate cable mechanism has a first effective length when the first plunger and the second plunger are engaged with the first transverse hole pair, such that the endgate is deployed at a first angle relative to the cargo box, and
       wherein the endgate cable mechanism has a second effective length when the first plunger and the second plunger are engaged with the second transverse hole pair, such that the endgate is deployed at a second angle, different from the first angle, relative to the cargo box.

11. The vehicle of claim 10, further comprising:
    a biasing member disposed between the first plunger and the second plunger, such that the first plunger and the second plunger are urged transversely outward.

* * * * *